United States Patent
Saadoun et al.

(10) Patent No.: US 11,164,563 B2
(45) Date of Patent: Nov. 2, 2021

(54) WAKE WORD BASED ON ACOUSTIC ANALYSIS

(71) Applicant: MOTOROLA SOLUTIONS, INC., Chicago, IL (US)

(72) Inventors: Fabrice Saadoun, Jerusalem (IL); Nissim Gean, Netanya (IL); Kenneth A. Haas, Sleepy Hollow, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 175 days.

(21) Appl. No.: 16/717,102

(22) Filed: Dec. 17, 2019

(65) Prior Publication Data

US 2021/0183370 A1 Jun. 17, 2021

(51) Int. Cl.
*G10L 15/08* (2006.01)
*G10L 15/30* (2013.01)
*H04W 4/02* (2018.01)

(52) U.S. Cl.
CPC .............. *G10L 15/08* (2013.01); *G10L 15/30* (2013.01); *H04W 4/02* (2013.01); *G10L 2015/088* (2013.01)

(58) Field of Classification Search
CPC .............. H04W 4/02; G10L 2015/088; G08B 13/1672; G08B 29/188
USPC .................................. 704/231–257, 270–275
See application file for complete search history.

(56) References Cited

U.S. PATENT DOCUMENTS

| | | | |
|---|---|---|---|
| 9,570,075 B1 * | 2/2017 | Kashimba | G08C 17/02 |
| 9,899,021 B1 * | 2/2018 | Vitaladevuni | G10L 15/14 |
| 10,069,976 B1 * | 9/2018 | Gunther | H04M 3/42 |
| 10,083,359 B2 | 9/2018 | Huang et al. | |
| 10,217,453 B2 | 2/2019 | Stevans et al. | |
| 10,257,740 B2 | 4/2019 | McDonald et al. | |
| 10,365,883 B2 * | 7/2019 | Goldstein | H04R 1/1091 |
| 10,748,529 B1 * | 8/2020 | Milden | G10L 15/22 |
| 11,100,918 B2 * | 8/2021 | Smith | G06Q 40/08 |
| 2003/0173829 A1 * | 9/2003 | Zeng | G06F 1/3262 307/116 |
| 2014/0237273 A1 * | 8/2014 | Hirano | G06F 1/32 713/320 |
| 2015/0063575 A1 * | 3/2015 | Tan | G06F 16/683 381/56 |
| 2016/0098921 A1 * | 4/2016 | Qutub | G06F 1/3206 367/197 |
| 2017/0162205 A1 * | 6/2017 | Melvin | G10L 17/22 |
| 2018/0046864 A1 * | 2/2018 | Flint | G10L 25/51 |
| 2018/0108343 A1 * | 4/2018 | Stevans | G10L 15/26 |
| 2018/0376111 A1 | 12/2018 | Mrowiec et al. | |

(Continued)

FOREIGN PATENT DOCUMENTS

WO 2018231133 A1 12/2018

OTHER PUBLICATIONS

The International Search Report and the Written Opinion corresponding patent application No. PCT/US2020/061735 filed Nov. 23, 2020, dated Mar. 17, 2021, all pages.

*Primary Examiner* — Jesse S Pullias

(57) ABSTRACT

A sound-enabled detection system responds to a wakeup sound, and notifies a central server. Based on which wakeup sound is detected; the system's configuration is modified accordingly. More particularly, at least one sensor in the system has its wakeup sound reconfigured to "wake up" upon detection of a second wakeup sound when the first wakeup sound is detected.

15 Claims, 4 Drawing Sheets

(56) References Cited

U.S. PATENT DOCUMENTS

2019/0018635 A1* 1/2019 Vassigh .................. G06F 3/167
2019/0251960 A1* 8/2019 Maker .................... G10L 15/08

* cited by examiner

WAKE WORD BASED ON ACOUSTIC ANALYSIS

BACKGROUND OF THE INVENTION

Oftentimes acoustic analysis will be utilized to determine whether or not particular public-safety events happen. For example, a gunshot detection system called Shotspotter®, manufactured by SSI, Inc. attempts to determine whether or not gunshots were detected. Such a system uses multiple acoustic sensors that detect when gunfire occurs, providing comprehensive outdoor coverage over complex urban geographies. When there is a shooting, sensors report this information and software triangulates and pinpoints the precise location of each round fired.

While the Shotspotter® system accurately detects and locates gunshots, it would be beneficial if a system existed that aided in detecting other types of public-safety events. Unfortunately, using a system like Shotspotter® for multi-event detection would require very high computation and power consumption, which would be prohibitively expensive for large, area-wide event detection.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
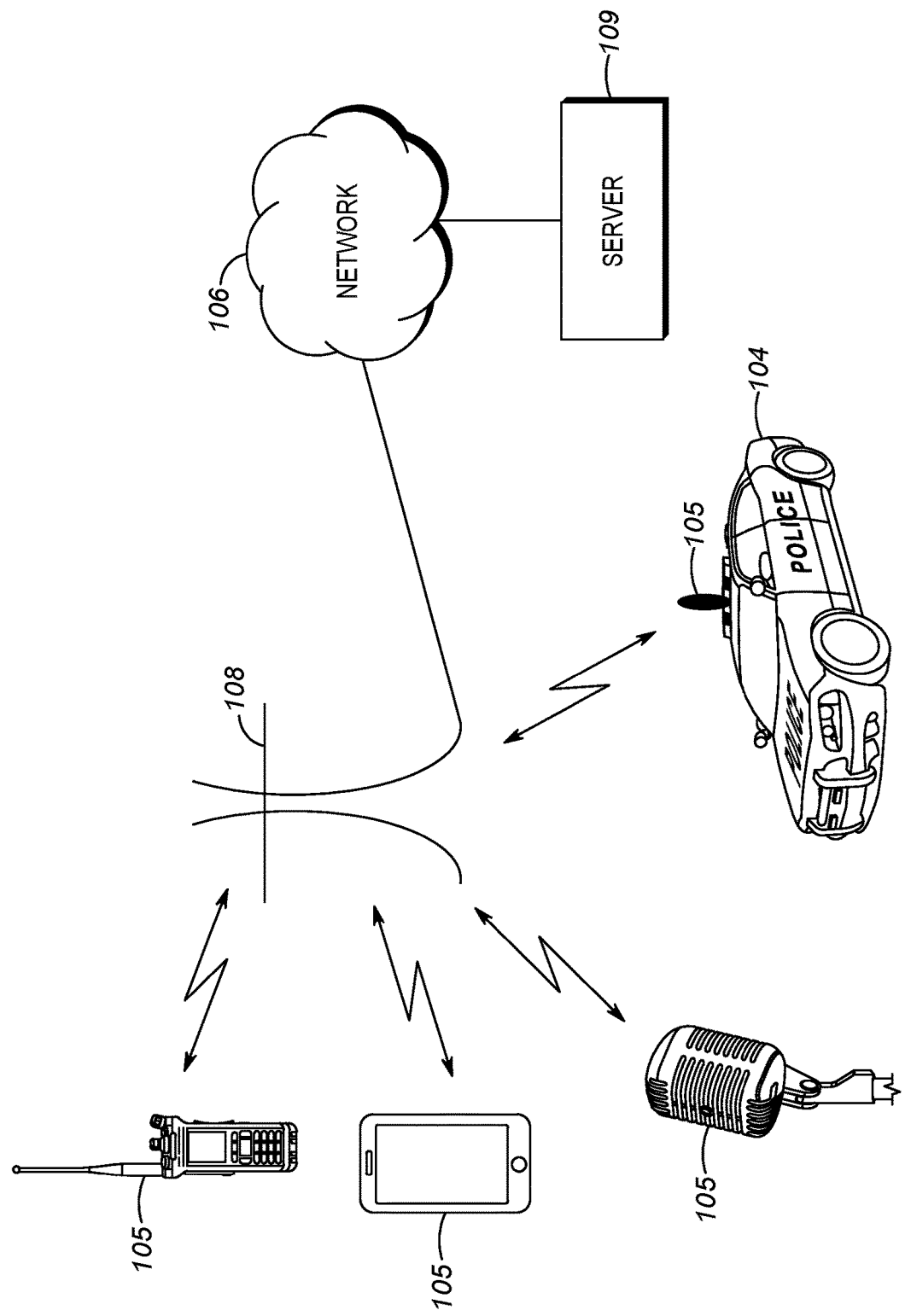
FIG. 1 is a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for predicting an event based on acoustic analysis is provided herein. A sound-enabled detection system responds to a wakeup sound, and notifies a central server. Based on which wakeup sound is detected; the system's configuration is modified accordingly. More particularly, at least one sensor in the system has its wakeup sound reconfigured to "wake up" upon detection of a second wakeup sound when the first wakeup sound is detected.

Expanding on the above, utilizing wakeup "sounds" in low-power modes of operation are commonly known in the area of personal digital assistants. Many virtual assistant systems perform continuous recognition that targets some particular wakeup phrase. This process is known as phrase spotting. Typically, a low-power, low complexity phrase spotting technique is utilized to detect a particular phrase. The low complexity phrase spotting is required to prevent exes power consumption and to not behave intrusively by responding to utterances not intended for it.

Various commercial implementations detect the phrases, "Hey, Siri", "OK, Google", and "Alexa". Various chip and software vendors, provide devices and algorithms optimized for phrase spotting. When the system recognizes a wakeup phrase, the system switches to a more computationally-intensive high-power mode, recognizing a much larger vocabulary to process more sophisticated utterances. The more-computationally-intensive mode processes speech until it detects an end-of-utterance condition, at which point it reverts to the low-power phrase-spotting state, typically after a short refractory period.

In the preferred embodiment of the present invention, upon detection of a wakeup sound, devices will send a notification that the sound has been detected, and then have their wakeup sound changed, and remaining/returning to a low-power, less-computationally-intensive mode. This allows edge devices to aide in detecting public-safety events with more confidence without having to waste precious resources. When the system recognizes a wakeup sound, the system may also switch to a more computationally-intensive high-power mode, recognizing a much larger vocabulary of sounds to process more sophisticated analysis. The more-computationally-intensive mode processes sounds for a predetermined period of time, at which point it reverts to the low-power sound-spotting state, typically after a short refractory period. As mentioned, upon reverting to the low-power sound-spotting state, the device may change its wakeup sound.

In order to better explain operation of the above-described devices, the following definitions are provided:

Primary Wakeup Sound (PWS)—a sound that acoustic detectors are configured to "wake" upon detecting. For example, a gunshot may be considered a primary wakeup sound that a low-power, low-complexity detector is configured to wake upon. Upon detecting the primary wakeup sound, a server will be notified, and multiple devices will be reconfigured to wake upon detection of a Secondary Wakeup Sound (SWS) used to aide in confirming that a particular public-safety event has happened.

Secondary Wakeup Sound (SWS)—a sound that acoustic detectors are configured to "wake" upon detecting. For example, a scream may be considered a secondary wakeup sound that a low-power, low-complexity detector is configured to wake upon. Upon detecting the secondary wakeup sound, a server will be notified, and multiple devices will be reconfigured to wake upon detection of other Secondary Wakeup Sounds used to aide in confirming that a particular public-safety event has happened. The SWS is a function of the PWS. In other words, the SWS is mapped to the PWS.

The mapping process preferably comprises an operation that associates each element of a given set (the domain) with one or more elements of a second set (the range). The PWSs comprises the domain, while the SWSs comprise the range. The mapping may be explicit based on predefined rules, or the mapping may be trained via machine learning. The mapping produces the SWSs.

A server will map the detected PWS to the SWS. More specifically, if PWS (x) is an element of a group of possible PWSs X (i.e., x∈X), we say that f "takes the value" or "maps to" f(x) at x. The set X is called the domain of the function f. The set of possible outcomes of y=f(x) is called the range. The mapping may be explicit based on predefined rules, or the mapping may be trained via, for example, machine learning. The mapping process preferably comprises an operation that associates each element of a given set (the domain, PWSs) with one or more elements of a second set (the range, SWSs) such that y=f(x), or SWS=Function (PWS).

During operation, acoustic monitoring devices will be configured to detect PWSs. Once detected, the information will be sent to a server, which can decide SWSs the device should detect. Various devices will be reconfigured to detect the SWSs. If there are more than one device at the same location, the server may configure devices to wake upon differing SWSs. For example, if a gunshot was detected as a PWS, then a first device may be configured to wake upon a human screaming, while another device may be configured to wake upon the utterance of "help". Once woken, devices will report the detection of PWSs and SWSs to the server. As more and more PWSs and SWSs are detected by the edge devices, the situational awareness will be more accurate.

FIG. 1 is a general operational environment for the present invention. As shown, the operating environment includes acoustic detection circuitry 105 which comprises any device capable of acoustic monitoring for wakeup sounds. As shown in FIG. 1, such devices include various microphones, smartphones, police radios, acoustic sensors mounted on vehicles, . . . , etc. Devices 105 are preferably spread through a wide area (e.g., citywide) to form a wide-area acoustic detection system. Devices 105 may also comprise stationary sensors located on, for example, light poles within an area. The sensors are specially designed to detect the report wakeup sounds being detected.

The operational environment additionally comprises server 109. Server 109 serves as an event determining system that provides information on the detection of particular wakeup sounds to a user, and configures devices with various wake sounds that may be dependent upon a prior wake sound being detected.

Network 106 is provided to facilitate communications between devices 105 and server 109. Network 106 may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Acoustic detection devices 105 are configured to operate in a low-power, low complexity mode of operation, listening for a PWS. In order to accomplish this task, dedicated circuitry and/or software is utilized for sound detection. Various chip and software vendors provide such circuitry optimized for phrase spotting.

Once devices 105 detects a wake-up sound, an event notification is sent through network 106 to server 109. The event notification may comprise the wakeup sound, or a description of the wakeup sound that caused the event notification to be sent to server 109. In response, server 109 may reconfigure at least one device 105 to change its wakeup sound from a first wakeup sound to a second wakeup sound. Devices that sent notifications may then enter a low-power state and listen for the second wakeup sound. If the second wakeup sound is detected, the device will again send an event notification through network 106 to server 109, notifying server 109 that the second wakeup sound has been detected. The devices may again be reconfigured with differing wakeup sounds.

Figure 2:
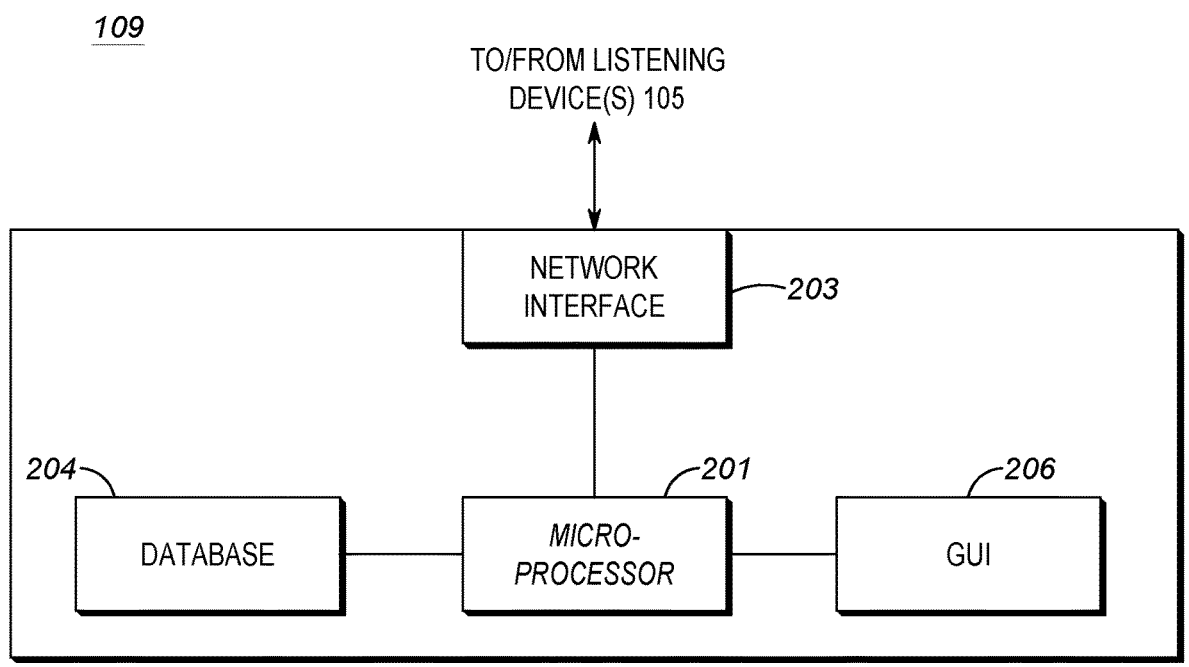
FIG. 2 is a block diagram of the server of FIG. 1.

FIG. 2 is a block diagram of server 109. As shown, server 109 comprises logic circuitry 201, network interface 203, database 204, and graphical-user interface (GUI) 206. In other implementations, server 109 may include more, fewer, or different components. Regardless, all components are connected via common data busses as known in the art.

Logic circuitry 201 comprises a digital signal processor (DSP), general purpose microprocessor, a programmable logic device, or application specific integrated circuit (ASIC) and is configured to receive an event notification from a device 105 and notify a user (via GUI) 206 that a particular wakeup sound has been detected. Logic circuitry 201 is also configured to reconfigure devices 105 to listen for an SWS when a PWS has been detected.

Database 204 is provided. Database 204 comprises standard memory (such as RAM, ROM, . . . , etc) and serves to store PWSs and their associated SWSs. For example, database 204 may comprise a table of PWSs. For each PWS, there may comprise at least one SWS associated with the PWS. As discussed, when a device "hears" the PWS, the device may be reconfigured to "listen" for an associated SWS. Multiple SWSs may be rank ordered and associated with a PWS, so, for example, if multiple devices 105 are at a particular incident scene, each detecting the PWS, the multiple devices may be reconfigured to listen to a unique SWS, so that each device on scene may listen for different SWSs.

GUI 206 provides a man/machine interface for providing information about detected PWSs and SWSs to a user and displaying information. For example, GUI 206 may provide a way of conveying (e.g., displaying) information received from processor 201. Part of this information may comprise a identification of a PWS/SWS detected, a location of the PWS/SWS detected, a recording of the PWS/SWS detected, an identification of the device which detected the PWS/SWS, . . . , etc. In order to provide the above features (and additional features), GUI 506 may comprise any combination of a touch screen, a computer screen, a keyboard, speaker, or any other interface needed to provide information to the user.

Finally, network interface 203 provides processing, modulating, and transceiver elements that are operable in accordance with any one or more standard land mobile radio (LMR) or cellular protocols described above, wherein some of the functionality of the processing, modulating, and transceiver elements may be performed by means of the logic circuitry 201 through programmed logic such as software.

Thus, as shown, server 109 comprises a network interface receiving an indication that a primary wakeup sound (PWS) was detected by a device, and logic circuitry determining a secondary wakeup sound (SWS) based on receiving the PWS, and reconfiguring the device to wake upon the detection of the SWS. As discussed, the SWS is based on the PWS.

As discussed, the logic circuitry can determine the SWS by mapping the PWS to the SWS such that SWS=Function (PWS). Additionally, a database may be provided comprising a plurality of PWSs and their associated SWSs, wherein the logic circuitry accesses the database to determine an SWS from a detected PWS.

A GUI is provided coupled to the logic circuitry and wherein the logic circuitry instructs the GUI to notify a user that the PWS was detected.

As discussed, the logic circuitry may receive a location of the device and base the SWS is on the location of the device. In addition, the logic circuitry may be configured to determine if other devices are near the device, and also base the SWS upon whether other devices are near the device.

Figure 3:
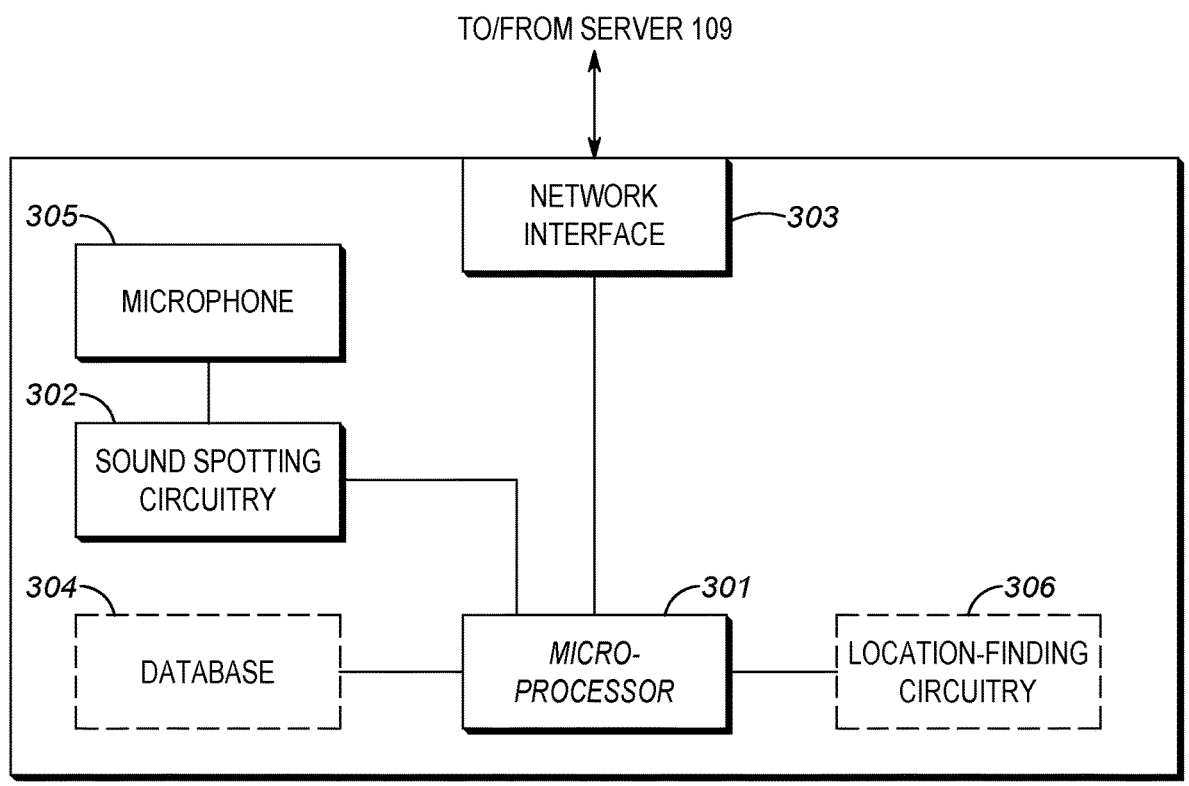
FIG. 3 is a block diagram of an acoustic monitoring device as shown in FIG. 1.

FIG. 3 is a block diagram of a device 105 as shown in FIG. 1. In addition to those components shown in FIG. 2, device 105 comprises microphone 305 and sound-spotting circuitry 302. Sound-spotting circuitry 302 preferably comprises low-cost, low-complexity microprocessor specifically designed for detecting a wake sound, and "waking" logic circuitry 301 when a particular sound has been detected. Sound-spotting circuitry may be configured with the particular sound to alert, or wake logic circuitry 301 as described in U.S. Pat. No. 10,217,453 entitled, VIRTUAL ASSISTANT CONFIGURED BY SELECTION OF WAKE-UP PHRASE, incorporated by reference herein.

It should be noted that in alternate embodiments of the present invention, logic circuitry 301 and sound-spotting circuitry 302 may be co-located within a single processor that operates in a low-power mode until a wake sound is detected.

During operation, utilizing microphone 305, sound-spotting circuitry 302 will be "listening" for a particular PWS. Once the PWS is detected, sound-spotting circuitry 302 will notify (possibly waking) microprocessor 301 that the PWS was detected. This causes logic circuitry 301 to notify server 109 of the event via network interface 303. In response, logic circuitry 301 may receive an SWS through interface 203 and reprogram/reconfigure circuitry 302 to "listen" for the SWS.

In an alternate embodiment of the present invention, logic circuitry 301 may reconfigure circuitry 302 with a second wake sound (SWS) by accessing database 304 and determining an SWS associated with the detected PWS. Database 304 is similar to the database described above with reference to FIG. 2, and comprises a list of PWSs and their associated SWSs.

It should be noted that in one embodiment of the present invention the PWS and the SWS may be based on a location. In this embodiment, devices may be configured with location-finding circuitry 306 in order to ascertain the device's location. Such location-finding circuitry may comprise a standard Global Positioning System (GPS) receiver, however in alternate embodiments other forms of location circuitry may be utilized as well. Each device 105 may periodically provide their location to server 109, as is known in the art.

Whether device 105 is determining the PWS or SWS, or whether server 109 is determining the PWS or SWS, sound-spotting circuitry 302 may be configured with a PWS or SWS based on a location of device 105. So, for example, a first PWS may be used when device 105 is located in a first geographical area, and a second PWS may be used with device 105 is in a second geographical area.

Expanding on the above, if device 105 is located in an area with a high amount of gunfire, then circuitry 302 may be configured with a PWS or SWS that detects gunfire. As a further example, if device 105 is located in an area where large crowds gather, then circuitry 302 may be configured with a PWS or SWS that detects people fighting. As is evident, the PWS or SWS (which may include wake words) may be configured based on public-safety statistics for a particular area, so that if a particular geographic area has a high incidence of a particular type of event, the PWS and SWS may be tailored in device 105 to detect the particular type of event.

Additionally, if multiple devices 105 are co-located in a same geographic area, circuitry 302 may be configured with a PWS or SWS so that no two devices share the same PWS or SWS. More particularly, if three devices 105 are located on a same block, a first device 105 may be configured with a first PWS, while a second device may be configured with a second PWS, and a third device may be configured with a third PWS. Thus, logic circuitry 301, or logic circuitry 201 will determine if multiple devices 105 are within a particular geographic area, or are within a predetermined distance from each other. If this is the case, then devices 105 will be configured such that at least two devices 105 will have differing PWS or SWS.

The configuration of PWSs and SWSs based on location will require server 109 or devices 105 to know the location of all devices 105. This can be accomplished by devices 105 sharing their locations with server 109, and server 109 reporting the locations of each device to devices 105.

With the above in mind, devices 105 comprise sound-spotting circuitry configured with a primary wakeup sound (PWS), and logic circuitry configured to be woken upon the sound-spotting circuitry detecting the PWS, and notify a user that the PWS was detected. The logic circuitry is also configured to reconfigure the sound-spotting circuitry with a secondary wakeup sound (SWS) when the PWS has been detected by the sound-spotting circuitry. As discussed, the SWS is based on the PWS.

As discussed, the logic circuitry may determine the SWS by mapping the PWS to the SWS such that SWS=Function (PWS). Also, a database may be provided that comprises a plurality of PWSs and their associated SWSs. The logic circuitry may access the database to determine an SWS from a detected PWS.

A network interface is provided so that the logic circuitry may notify the user that the PWS was detected by notifying a server via the network interface.

Location-finding circuitry may be provided to determine a location of a device, and the SWS is may also be based on the location of the device.

The logic circuitry can be configured to determine if other devices are near the device, and wherein the SWS may also be based upon whether other devices are near the device.

Figure 4:
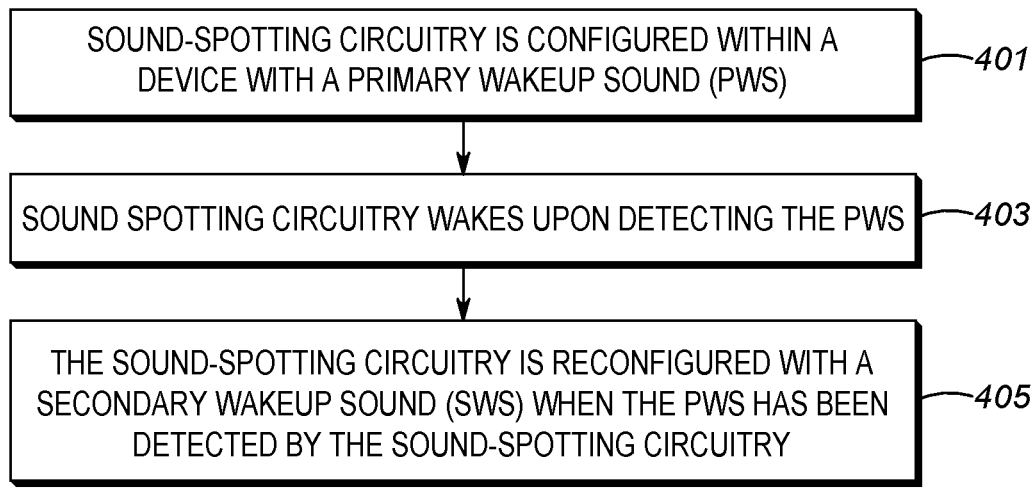
FIG. 4 is a flow chart showing operation of the device of FIG. 3 and the server of FIG. 2.

FIG. 4 is a flow chart showing operation of device 105 and server 109. The logic flow begins at step 401 where sound-spotting circuitry is configured within a device with a primary wakeup sound (PWS). At step 403 sound spotting circuitry wakes upon detecting the PWS. At step 405, the sound-spotting circuitry is reconfigured with a secondary wakeup sound (SWS) when the PWS has been detected by the sound-spotting circuitry.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
 a network interface configured to receive an indication that a non-verbal primary wakeup sound (PWS) was detected by a device;
 logic circuitry configured to:
  determine a non-verbal secondary wakeup sound (SWS) associated with the detected non-verbal PWS; and
  reconfigure the device to change its wakeup sound from the non-verbal PWS to the non-verbal SWS upon a detection of the non-verbal PWS;
 wherein the non-verbal PWS is a first sound type and the non-verbal SWS is a second sound type determined based on the non-verbal PWS.

2. The apparatus of claim 1 wherein the logic circuitry determines the non-verbal SWS by mapping the non-verbal PWS to the non-verbal SWS such that non-verbal SWS=Function(non-verbal PWS).

3. The apparatus of claim 1 further comprising:
 a database comprising a plurality of non-verbal PWSs and their associated non-verbal SWSs; and wherein the logic circuitry accesses the database to determine an non-verbal SWS from a detected non-verbal PWS.

4. The apparatus of claim 1 further comprising:

a graphical user interface (GUI) coupled to the logic circuitry; and wherein the logic circuitry instructs the GUI to notify a user that the non-verbal PWS was detected.

5. The apparatus of claim 1 wherein:

the logic circuitry receives a location of the device; and wherein the non-verbal SWS is also based on the location of the device.

6. The apparatus of claim 5 wherein:

the logic circuitry is configured to determine if other devices are near the device; and wherein the non-verbal SWS is also based upon whether other devices are near the device.

7. An apparatus comprising:

sound-spotting circuitry configured with a non-verbal primary wakeup sound (PWS);

logic circuitry configured to be woken upon the sound-spotting circuitry detecting the non-verbal PWS, and notify a user that the non-verbal PWS was detected; and wherein the logic circuitry is also configured to reconfigure the sound-spotting circuitry with a non-verbal secondary wakeup sound (SWS) when the non-verbal PWS has been detected by the sound-spotting circuitry;

wherein the non-verbal PWS is a first sound type and the non-verbal SWS is a second sound type determined based on the non-verbal PWS.

8. The apparatus of claim 7 wherein the logic circuitry determines the non-verbal SWS by mapping the non-verbal PWS to the non-verbal SWS such that non-verbal SWS=Function(non-verbal PWS).

9. The apparatus of claim 7 further comprising:

a database comprising a plurality of non-verbal PWSs and their associated non-verbal SWSs; and wherein the logic circuitry accesses the database to determine a non-verbal SWS from a detected non-verbal PWS.

10. The apparatus of claim 7 further comprising:

a network interface; and wherein the logic circuitry notifies the user that the non-verbal PWS was detected by notifying a server via the network interface.

11. The apparatus of claim 7 further comprising:

location-finding circuitry determining a location of a device; and wherein the non-verbal SWS is also based on the location of the device.

12. The apparatus of claim 11 wherein:

the logic circuitry is configured to determine if other devices are near the device; and wherein the non-verbal SWS is also based upon whether other devices are near the device.

13. A method comprising the steps of:

configuring sound-spotting circuitry within a device with a non-verbal primary wakeup sound (PWS);

waking upon the sound-spotting circuitry detecting the non-verbal PWS; and reconfiguring the sound-spotting circuitry with a non-verbal secondary wakeup sound (SWS) when the non-verbal PWS has been detected by the sound-spotting circuitry;

wherein the non-verbal PWS is a first sound type and the non-verbal SWS is a second sound type determined based on the non-verbal PWS.

14. The method of claim 13 wherein the step of reconfiguring comprises the step of determining the non-verbal SWS by mapping the non-verbal PWS to the non-verbal SWS such that non-verbal SWS=Function(non-verbal PWS).

15. The method of claim 13 wherein the non-verbal SWS is also based on a location of the device.

* * * * *